United States Patent [19]
Pearson

[11] Patent Number: 5,560,150
[45] Date of Patent: Oct. 1, 1996

[54] STRUCTURE FOR TELECOMMUNICATIONS EQUIPMENT ENCLOSURE

[75] Inventor: Gordon I. Pearson, Hernando, Fla.

[73] Assignee: Professional Systems, Inc., Hartland, Wis.

[21] Appl. No.: 388,791

[22] Filed: Feb. 15, 1995

[51] Int. Cl.⁶ .................................................. E04H 5/02
[52] U.S. Cl. .............................. 52/79.14; 52/143; 52/265; 52/274; 52/294; 52/309.12; 52/408; 52/414
[58] Field of Search ........................ 52/408, 79.1, 79.14, 52/449, 414, 344, 335, 338, 327, 310, 380, 258, 264, 265, 274, 245.05, 245.01, 745.14, 745.19, 745.2, 405.1, 309.12, 79.5, 143, 169.2, 299, 302.3; 294/741.4, 741.41; 414/480, 506.01, 506.06

[56] References Cited

U.S. PATENT DOCUMENTS

| 871,606 | 11/1907 | Moesterns | 52/414 |
|---|---|---|---|
| 3,068,535 | 12/1962 | Gruber et al. | 52/327 X |
| 3,357,147 | 12/1967 | Lerner | 52/335 X |
| 3,415,025 | 12/1968 | Walz et al. | 52/299 X |
| 3,496,691 | 2/1970 | Seaburg et al. | 52/335 X |
| 3,707,811 | 1/1973 | Hampson | 52/143 X |
| 4,005,253 | 1/1977 | Walter . | |
| 4,040,227 | 8/1977 | van der Lely et al. | 52/79.1 X |
| 4,333,280 | 6/1982 | Morton | 52/414 X |
| 4,432,171 | 2/1984 | Boot . | |
| 4,470,227 | 9/1984 | Bigelow, Jr. et al. . | |
| 4,501,052 | 2/1985 | Mengeringhausen | 52/449 X |
| 4,507,901 | 4/1985 | Carroll | 52/338 X |
| 4,577,446 | 3/1986 | Stefan . | |
| 4,653,237 | 3/1987 | Taft | 52/338 X |
| 5,036,638 | 8/1991 | Kurtz, Jr. . | |
| 5,235,133 | 8/1993 | Roth et al. . | |
| 5,259,157 | 11/1993 | Ault | 52/144 |

Primary Examiner—Robert J. Canfield
Attorney, Agent, or Firm—Ryan, Maki, Mann & Hehenfeldt

[57] ABSTRACT

A housing for telecommunication equipment is provided having a supporting base including a concrete floor poured in place and supported above the surface of a concrete pad or in ground excavation on a supporting framework formed of expanded metal, preferably steel. A layer of metal foil, insulation or other sheet material in interposed on the expanded metal to form a fluid tight surface for pouring thereon of the liquid concrete mixture.

4 Claims, 2 Drawing Sheets

U.S. Patent
Oct. 1, 1996
Sheet 1 of 2
5,560,150
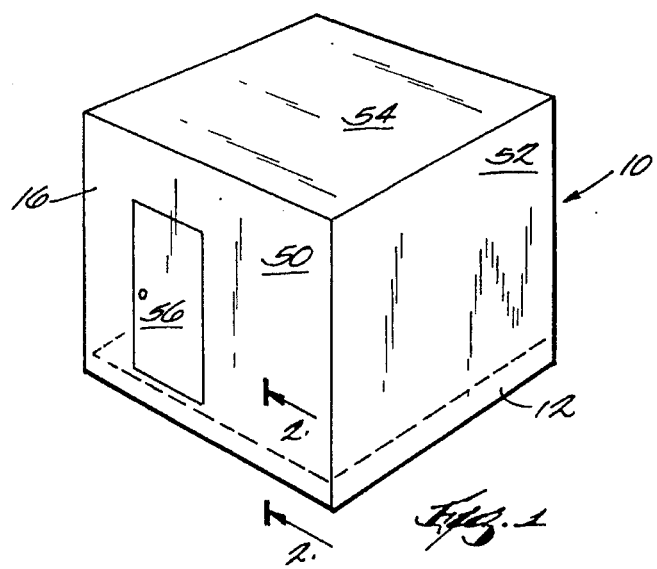
Fig. 1
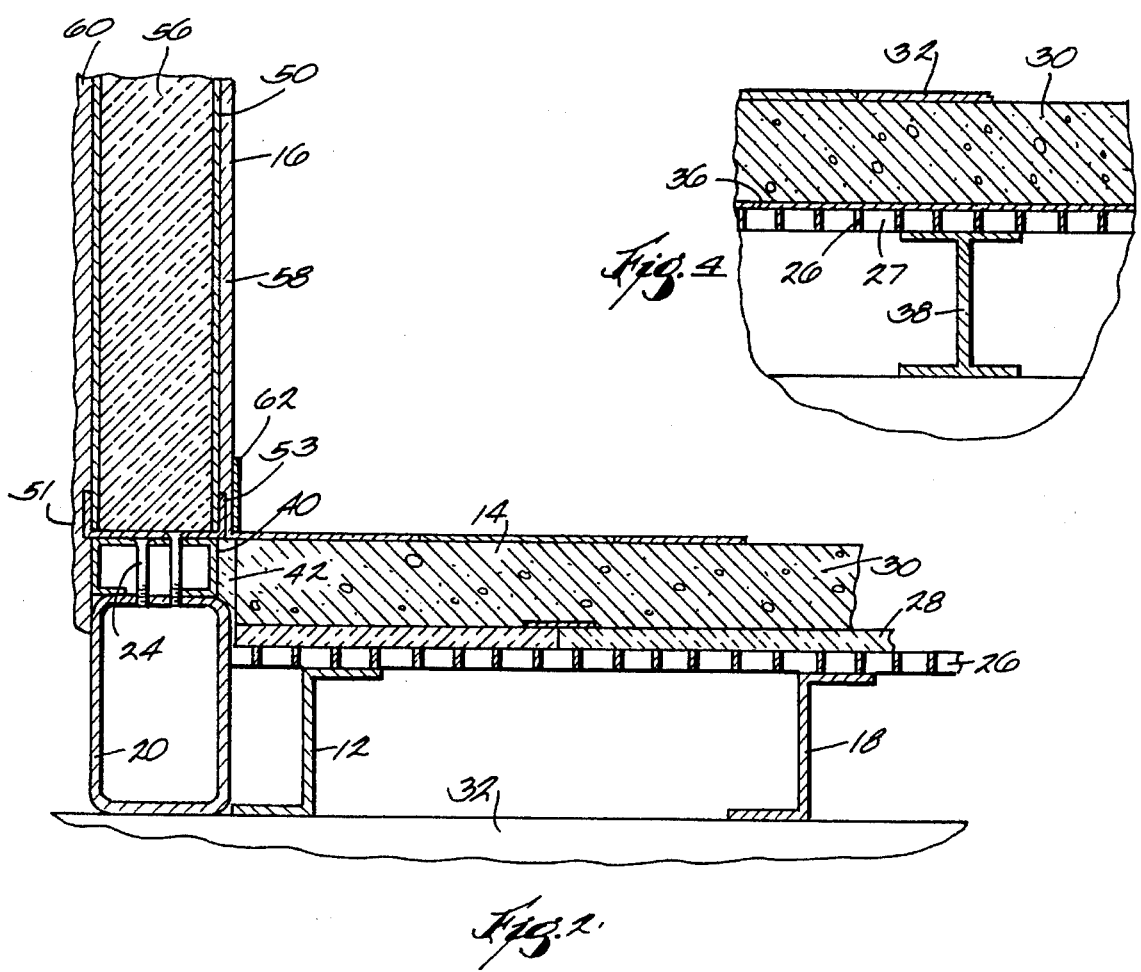
Fig. 4
Fig. 2

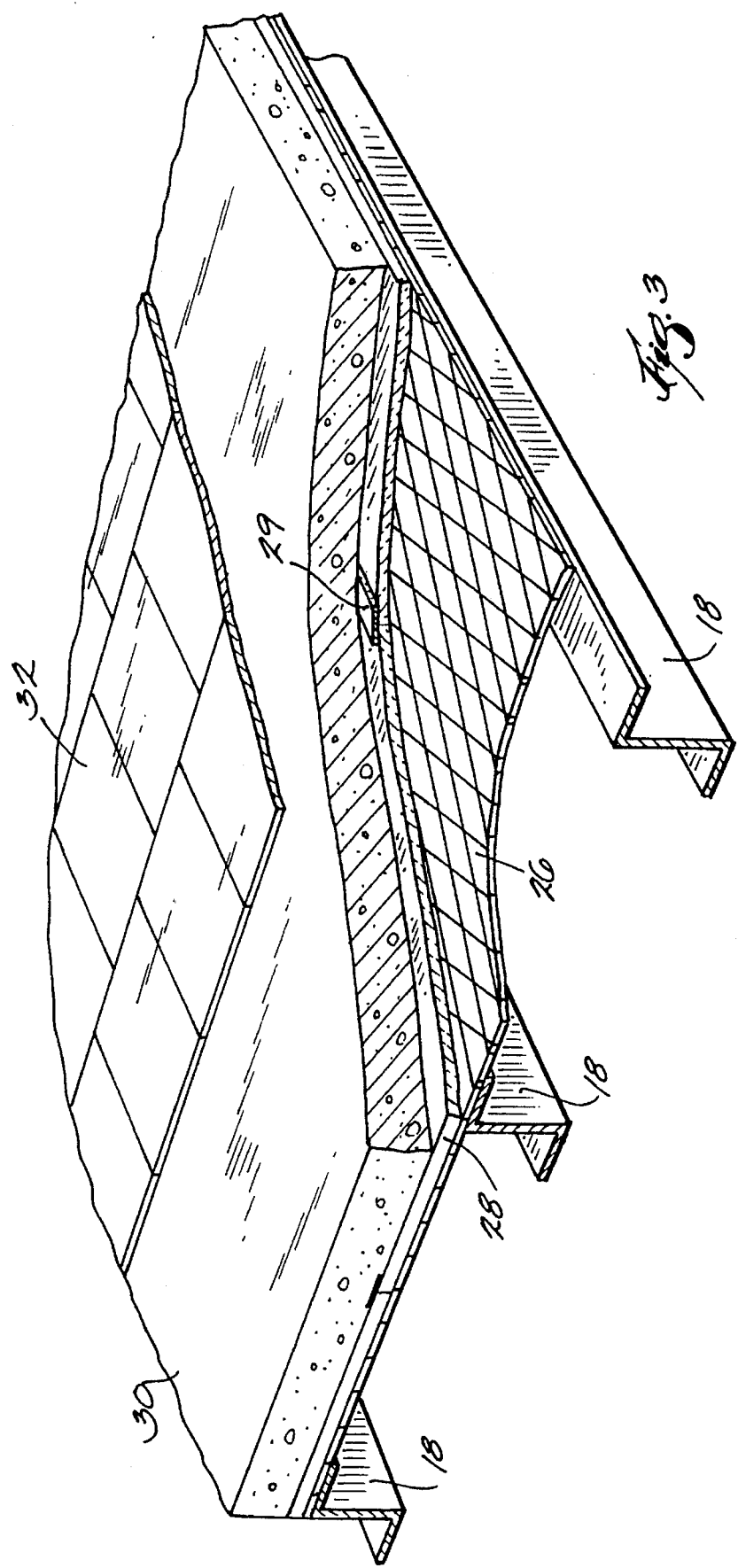

STRUCTURE FOR TELECOMMUNICATIONS EQUIPMENT ENCLOSURE

FIELD OF THE INVENTION

This invention relates to electronic equipment enclosures. More particularly, the invention relates to structures commonly known as remote terminal enclosures for housing of telecommunications equipment such as loop electronics or the like at remote locations.

BACKGORUND OF THE INVENTION

It has become commonplace to house telecommunications equipment at locations remote from any central office or facility. Such remotely located electronic equipment is placed so that messages can be sent directly from one nearby user to another without the need for routing through a central office.

The structures heretofore available to house such equipment have often paralleled conventional buildings. Such structures are usually set at grade level, usually on a concrete pad. However the visible height of the structures may, if desired, be reduced by burying the lower ends thereof in the ground.

The structures in addition to housing the electronic telecommunications equipment may contain air conditioning equipment, smoke detectors, intrusion alarms, and standard electrical power connections. It is very important that such structures are pest and rot resistance and have long term strength and integrity while at the same time being economical and hence cost effective.

SUMMARY OF THE INVENTION

It is an object of the present invention to provide an improved structure for a system for housing telecommunications equipment. It is a further object of the invention to provide such a system that includes an improved floor component that is durable and impervious to pests and exterior weather conditions and a method of forming the same which provides manufacturing economies.

A related object is to provide such a framework that can be formed in place or, if preferred, preformed and subsequently transported to a site for installation. Yet another aspect of the invention relates to the use of a framework that may support a structure on a concrete pad or, alternatively, becomes embedded in the ground to form a foundation for supporting the floor and lower section of a structure in the ground a short distance above the bottom surface of an underground excavation.

A still further aspect of the invention relates to providing method of forming floor structures for housing telecommunications equipment wherein a support layer for pouring of a concrete layer remains in place to form part of the reinforcement for the structure.

A still further aspect of the invention is to provide a structure wherein the supporting base can be formed of a durable material such as concrete formed in place on a supporting, preferably insulated, perforated metal structure thereby forming an improved composite supporting base. A related aspect relates to the use of expanded steel as a cost effective perforated metal component.

Briefly summarized the invention achieves it's objectives by providing a housing for telecommunication equipment having a concrete floor poured in place and supported above the base surface of an in ground excavation on a supporting framework formed of perforated metal, preferably expanded steel. A layer of metal foil, insulation or other sheet material in interposed on the expanded metal to form a fluid tight surface for pouring thereon of the liquid concrete mixture. The resultant composite structure forms a thermally insulated structure which effectively shields the equipment housed therein from the elements.

BRIEF DESCRIPTION OF THE DRAWINGS

The invention will be further set forth in the following detailed description and accompanying drawings wherein:

FIG. 1 is a perspective view of an assembled enclosure of this invention;

FIG. 2 is a cross sectional view taken along Line 2—2 of FIG. 1 showing the structure supported on an earthen surface;

FIG. 3 is a perspective view of a framework and floor component in accordance with the present invention; and, FIG. 4 is a fragmentary sectional view showing a floor component in accordance with a further embodiment of the invention.

DETAILED DESCRIPTION

Referring more particularly to the drawings, a telecommunications enclosing structure of the present invention is generally identified by numeral 10. The enclosure 10 includes a lower frame component 12, a floor component or base 14 and an upper housing 16.

As best seen in FIG. 2–3 the supporting framework 12 is preferable formed by a plurality of structural steel members 18 and 20, which may be in the form of I-beams 38 rather than Z-beams 18 and 20 as illustrated. Other frame components such as suitably dimensioned pieces of I-beams, Z or C-channels are utilized to provide a desired degree of strength to framework 12. As seen in FIG. 2 the framework 12 and base 14 are placed on a concrete pad 32, or in some cases, on crushed rock or in an excavation in the earth.

As seen in FIGS. 1 and 2, upper housing 16 includes opposed side walls 50 and opposed end walls 52 in which at least one access door 56 is provided. The walls are interconnected with roof 54 along their upper edges. Various connection boxes or housings are provided as needed for connection of the structure and components contained therein a two way telecommunication system and a source of power that runs the equipment contained in the structure.

The lower edges of walls 50 and 52 are mounted between flanges 51 and 53. A layer of insulation 56 is preferably also provided within the structure of walls 50 and 52.

As best seen in FIGS. 2–4, floor structure 14 includes a supporting layer 26 of perforated or "expanded" metal, preferably steel. Expanded metal 26 includes numerous openings 27 and thus cannot be used per se as a base upon which a cement mixture can be cast. In accordance with the invention, it is preferred that a layer 28 of insulative material such as polymeric foam be positioned over expanded metal 26. The seams between sheets of foam material 28 can be sealed by means of a tape 29 which may be, for example, a metallic foil tape. In accordance with the invention, a layer 30 of cement is cast in place over expanded metal 26 (or any other type of perforated metal) and intermediate layer 28. The layer of perforated metal thus becomes an integral part of the composite floor structure and provides support and reinforcement therefore. A layer 32 of conventional flooring material can be placed over concrete layer 30 to give a suitable finished appearance to the interior of structure 10.

In accordance with the embodiment of FIG. 4, insulative layer 28 can be omitted. Instead, a layer of impervious material such as foil 36 or sheets of metalized tape can be utilized to support the cement layer 30 when it is in a fluid state. Thus, it is possible to use the perforated metal structure 26 as a support for the cement 30 during casting. It will be noted that since the layer 30 is formed in situ that the expanded metal and any layers imposed between the expanded metal 26 and concrete 30 remain together as a unitary structure with the expanded metal 26 providing reinforcement to the concrete layer 30. In FIG. 4 an I-beam 38 is shown rather than Z-beams 12 and 18 of FIGS. 2 and 3, such I-beams being preferred in many cases.

To form a suitable perimeter for pouring or casting of concrete 30, a perimeter formed of structural steel 40 can be attached to perimeter frame member 20 by means of bolts 24. If desired, a layer 42 of insulative material can be placed on the inside perimeter of structural members 40 to separate the concrete layer 30 from members 40 and, thus, allow for thermal expansion.

The interiors of walls 50 and 52 can be finished by means of conventional construction materials such as plywood or glass board. The exterior can also be finished with durable structural material such as sheets of stoneboard or the like. For structural integrity, it is preferred that steel studs and structural members be utilized within the structures of walls 50 and 52, but wood can be used instead, if desired.

It is preferred that concrete 30 be formed of a concrete material containing structural fibers. For pouring of the concrete and troweling to a smooth condition, it is preferred that a concrete curing agent be applied by brushing or spraying in accordance with known procedures. After the concrete materials have cured, floor tiles 32 can be applied utilizing conventional floor tile adhesives which may be troweled over the concrete 30. A baseboard material 62 which may be, for example, four inch vinyl material is preferably applied to the interior of the wall surfacing material 58.

While preferred embodiments of the invention have been described herein it will be readily apparent to those skilled in the art that various modifications thereof can be made without departing from the spirit of the invention. Accordingly the invention is to be limited only by the scope of the appended claims and equivalents thereof.

What is claimed is:

1. A structure for housing communication equipment comprising a base component including a lower framework adapted for placement on a supporting base surface in an outdoor location, said framework having a generally horizontal floor surface comprising a structural concrete layer, said layer being adapted to be supported off of the surface of said supporting base surface on said lower framework, said framework including a horizontal layer of perforated metal, a layer of fluid impervious material being interposed between said framework and said concrete, said concrete being cast in place in contact with said fluid impervious material, and an upper housing matingly fitted on said base component, said upper housing having at least one door therein for access to the interior of the housing and having means at its lower perimeter for engagement with the of said base component, said upper housing and said base component providing a weatherproof enclosure.

2. A structure according to claim 1 wherein said door is provided with a seal around the perimeter thereof adapted to engage the perimeter of an opening therefor in said housing.

3. A structure according to claim 1 wherein said layer of fluid impervious material comprises a layer of thermal insulation positioned over said perforated metal forming a fluid tight layer.

4. A structure according to claim 1 wherein said perforated metal comprises expanded steel.

* * * * *

UNITED STATES PATENT AND TRADEMARK OFFICE
CERTIFICATE OF CORRECTION

PATENT NO.    :  5,560,150

DATED         :  October 1, 1996

INVENTOR(S)   :  Gordon I. Pearson

It is certified that error appears in the above-identified patent and that said Letters Patent is hereby corrected as shown below:

Column 4, Line 27 (Claim 1)    insert --- top --- before "of said base"

Signed and Sealed this

Fourth Day of February, 1997

Attest:

BRUCE LEHMAN

*Attesting Officer*            *Commissioner of Patents and Trademarks*